United States Patent Office 3,424,598
Patented Jan. 28, 1969

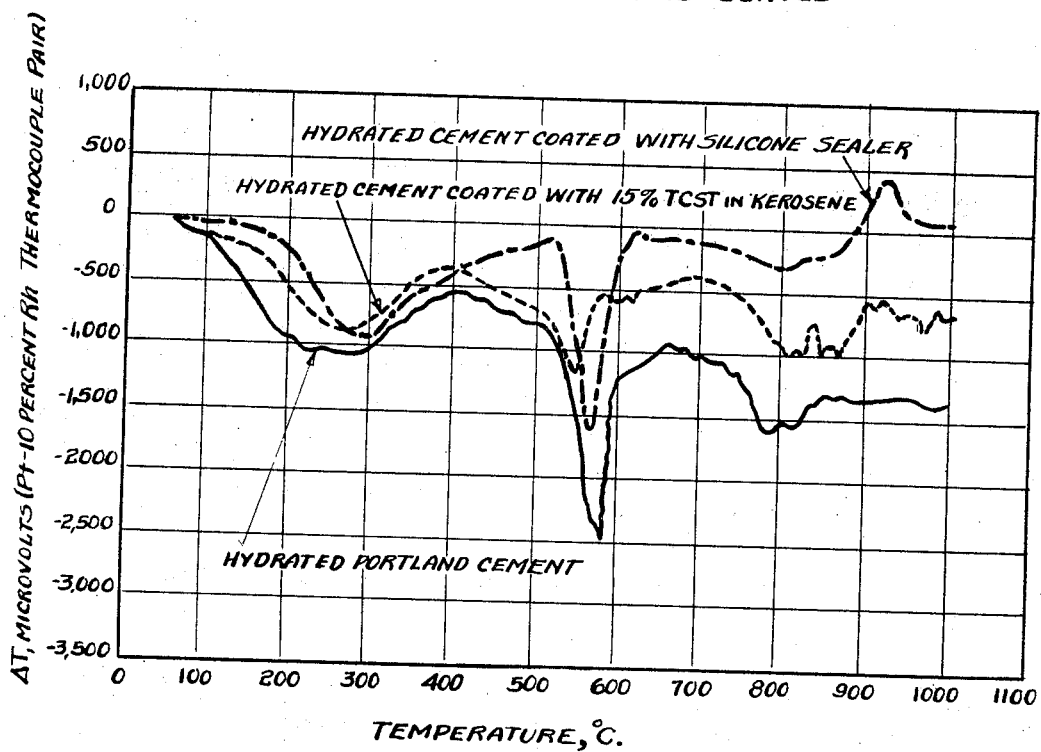

---

3,424,598
COATING FOR SILICEOUS MATERIALS
Milton J. Snyder and Edward S. Lipinsky, Columbus, and Joseph E. Burch, Dublin, Ohio, assignors, by mesne assignments, to Fats and Proteins Research Foundation, Inc., Des Plaines, Ill., a corporation of Illinois
Filed Sept. 29, 1966, Ser. No. 583,049
U.S. Cl. 106—2   17 Claims
Int. Cl. C09d 5/00; C08h 9/00

ABSTRACT OF THE DISCLOSURE

A coating composition that is suitable for waterproofing concrete and analogous materials of a cemetitious or calcerous nature comprises the reaction product of a silane having at least one hydrogen atom, the remaining substituents being hydrolyzable halogen atoms, and a fatty substance comprising an ester of a trihydric alcohol having an internally unsaturated acyl group. The coating composition also includes a volatile vehicle that is inert with respect to the defined reaction product.

---

This invention relates generally to the surface-coating of concrete and other siliceous materials and more particularly to water-repellent surface coatings for concrete and like cementitious substances.

In the past, attempts have been made to provide poured concrete structures, mortar joints and the like with water-repellent properties by adding certain agents to the wet mixture. However, those agents which have shown the most promise as water proofers have been found to interfere with the hydration reaction, effecting a reduction in the strength of the cured units. Coatings have also been considered. Of these, asphalt compositions are expensive to apply and are unsightly and therefore limited to uses below grade; oil-based paints act as vapor barriers tending to trap moisture in the masonry structure; free fatty acids have nutrient properties and hence are susceptible to erosion by soil-borne and air-borne microorganisms; inedible fats are not strongly attached to hydrated cement; and silicone resins deteriorate rapidly, particularly when subjected to constant wetting, and are not sufficiently hydrophobic for the purpose.

It is therefore an important object of the present invention to provide an inexpensive, substantially colorless, hydrophobic coating material capable of bonding tenaciously to a cementitious substrate.

A more general object is to provide a new and improved coating product for siliceous substrates.

Another object of the invention is to provide a coating material which is characterized by its ability to polymerize after being applied to the substrate.

Still another object of the invention is to provide a coating composition which is resistant to the attack of micro-organisms.

And still another object of the invention is to provide a coating composition having a high degree of permanence.

A further object of the invention is to provide a novel, coated, silicate-containing article.

These and other objects and features of the invention will become more apparent from a consideration of the following descriptions.

As used herein, the term "fatty substance" means a substance which contains a triglyceride as a principal ingredient; the term "mixed triglyceride" means a triglyceryl ester having both saturated and unsaturated acyl groups; and the term "volatile vehicle" means a liquid carrier which is susceptible of easy evaporation whereby to leave a dissolved or dispersed material as a coating residue.

The coating composition of the invention comprises the reaction product of a silane having a hydrolyzable substituent and a fatty substance in which the constituent triglyceryl ester has an unsaturated acyl group. This reaction product is advantageously dissolved or dispersed in a volatile vehicle for application to a substrate which it is desired to coat, and the reaction product itself has been prepared by ultraviolet radiation of an ethereal solution of the two ingredients. Combination of the reactants takes place by addition of the silane at an olefinic linkage in the unsaturated acyl group of the triglyceride. The reaction can be made to occur by the application of heat or by using catalysts of the peroxide-type as well as by ultraviolet initiation.

The reaction product of the invention bonds tenaciously to cured concrete, mortar and other substrates containing silicates; and it is theorized that the reaction product of the invention enters into chemical union with silcates by means of hydrolyzaton of the reaction product and subsequent formation of —Si—O—Si— linkages between the silicates and the hydrolyzed product. It is also theorized that union of the reaction product of the invention takes place by salt formation with calcium ions when the same are present in the substrate. While the actual mechanism of bonding has not been ascertained, the fact of union has been clearly established by differential thermal analysis.

Referring to the single figure of drawing, it will be apparent that the normal water-of-hydration endotherm at about 250° C. is considerably reduced for the specimen coated with trichlorosilanated tallow (TCST) as compared with the untreated concrete specimen. In addition, it will be observed that the calcium hydroxide endotherm at about 500° to 600° C. is also greatly reduced for the TCST coated specimen. These differences in the differential thermal analysis curves clearly indicate that a chemical reaction has occurred between the coating material of the invention and the calcium hydroxide and/or the hydrated calcium silicate compounds of the hardened portland cement substrate. Examination, at the calcium hydroxide endotherm, of the sample treated with a commercial silicone sealer shows substantially no reaction between this latter coating and the substrate.

The reaction product of the invention is also characterized by its ability to polymerize after having been placed on a substrate, and this polymerization in situ will be occasionally referred to hereinafter as "curing." The reaction product of the invention readily undergoes hydrolysis resulting in production of the corresponding hydroxysilicon derivative. Two molecules of the latter derivative lose water to give —Si—O—Si— ethers of the poly(alkylsiloxane)-type wherein the alkyl group comprises the selected triglyceride.

The silane reactant takes the general structural formula:

wherein $n$ is an integer from 1 to 3; $y$ is an integer from 1 to 3; and X is a halogen atom (chlorine, bromine or iodine), a hydroxyl group, or a hydroxyl group with the hydrogen atom replaced by an alkyl, aryl, alkaryl or acyl group. Thus, the useful silanes for the purpose of the present invention contain at least one hydrogen atom and at least one hydrolyzable group linked to the silicon atom. Although silanes having more than one hydrogen atom are capable of reacting with the unsaturated triglyceride, they are also capable of further reaction with such material or with a different unsaturated material. As to the type of hydrolyzable substituent, halosilanes, and particularly chlorosilanes are especially convenient starting materials; and while monohalosilanes contain a hydrolyzable halogen atom requisite to polymerization of the reaction product in situ, trihalosilanes are particularly advantageous because they promote a maximum occurrence of branching or cross-linking upon cure of the reaction product, leading to higher molecular weights and a more rigid finished coating. Of the halosilanes which find utility in the present invention, trichlorosilane is presently preferred because of its availability and low price.

The degree of silanation of the fatty substance has exhibited an influence on the effectiveness of the finished coating; and relative completeness of silanation, as expressed by the reduction of unsaturation of the fatty substance, has been correlated with maximum utility. In the case of water-proofing of a cementitious substrate, a reaction product containing from approximately 0 to 10% residual olefin has been found to be markedly more effective than reaction products containing respectively 28 and 35% residual olefin.

As has been described hereinabove, the reactant fatty substance is selected to be a triglyceride having an unsaturated acyl group. Of such substances, mixed triglycerides are especially useful because of their occurrence in natural products; and it has been found that mixed triglycerides can be used as they occur in natural fats and oils without extensive purification or separation. Contrary to the eminent usefulness of esters of polyhydric alcohols in the present invention, esters of monohydric alcohols, such as methyl oleate, have not proved to be particularly effective.

The fatty substance for use in the invention is chosen to contain at least one unsaturated acyl group in order to effect addition reaction with the selected silane. The mixed triglycerides of natural fats and oils satisfy this requirement in that such materials commonly comprise oleic acid esters. Unexpectedly, fatty substances which are principally mono-unsaturated triglyceryl esters are of greater utility than those which are primarily composed of poly-unsaturated esters. In this regard, beef tallow, although averaging about 1½ unsaturated sites per triglyceride molecule, is of high utility because the unsaturated sites are not randomly distributed, monon-unsaturated fatty acid moieties predominating over doubly-unsaturated moieties by a factor of about 20:1. Furthermore, internal olefinic linkages are preferred to terminal olefinic linkages. More specifically, the reaction of the silanes of the invention with fatty substances comprising primarily mono-unsaturated triglyceryl esters has produced nearly quantitative yields whereas reaction with materials that are mostly poly-unsaturated triglyceryl esters has produced lower yields than expected, less than one double bond per molecule apparently having reacted in the latter instances. The results of reacting various fatty substances with trichlorosilane are set forth in Table I below.

TABLE I

| Fatty substance | Iodine value of olefin | Grams of product Theoretical [1] | Grams of product Actual | Percent uptake [1] |
|---|---|---|---|---|
| Beef tallow [2] (inland products) | 51 | 127 | 131 | 110 |
| Soybean oil (ADM superb) | 129 | 169 | 118 | 26 |
| Linseed oil (ADM superb) | 180 | 196 | 112 | 13 |

[1] Based on the theoretical amount of trichlorosilane which could react (calculated from iodine number).
[2] Dried by azeotropic distillation with benzene prior to reacting with trichlorosilane.

Whereas the fatty substance for reaction with the silane desirably contains but about a single olefinic linkage per molecule, and that at an internal position, the hydrocarbon chains in both the saturated and unsaturated acyl groups of the triglyceride are selected to include from 4 to 22 carbon atoms; and hydrocarbon chains containing from 12 to 22 carbon atoms are especially desirable, particularly in the saturated acyl groups and where a high degree of water-repellency is desired in the ultimate coating. Mono-carboxylic acids are preferred for both the saturated and unsaturated acyl groups in order to minimize the presence of reactive oxygen atoms and the consequent potential for developing hydrophilic sites.

Exemplary natural fats and oils for use in the present invention include domestic mammalian body fats, such as lard and tallow; vegetable butters, such as cocoa butter and palm oil; and vegetable oils, such as olive oil, linseed oil, soybean oil and cottonseed oil. Castor oil is not particularly useful in the practice of the invention because of the component hydroxy-substituted fatty acid, recinoleic acid, that it contains; and coconut oil is not of advantage because it is so nearly saturated.

The reaction product of the invention is advantageously applied from a volatile vehicle; and non-polar solvents, such as mineral spirits are preferred in this regard to polar but unreactive solvents such as dioxane. Dioxane is also less preferred because of its tendency to absorb moisture, and thereby pose a hazard toward premature hydrolyzation of the coating material, and because of its propensity for forming explosive peroxides. Reactive polar solvents, such as alcohols, are to be avoided because they induce premature reaction of any substituent hydrolyzable groups. With respect to the waterproofing cementitious substrates, the concentration of the reaction product in the vehicle shall be at least about 5% by weight and preferably about 15% by weight. As is indicated in Table II below, the rate of water-absorption of concrete specimens which were coated with trichlorosilanated tallow (TCST) decreased substantially when the concentration of the reaction product was increased from 5% to 15% whereas an increase in the concentration above the 15% level resulted in only marginal increments of further improvement.

TABLE II

| Concentration of TCST. (percent by weight) | Water absorption [1] (percent by weight) after immersion | | | | | | |
|---|---|---|---|---|---|---|---|
| | 1 day | 4 days | 7 days | 11 days | 18 days | 25 days | 32 days |
| None | 10.4 | 10.3 | 10.4 | 10.4 | 10.5 | 10.6 | 10.7 |
| 5 | 3.34 | 6.56 | 7.81 | 8.55 | 9.24 | 9.47 | 9.67 |
| 10 | 1.47 | 3.40 | 4.29 | 5.00 | 5.87 | 6.26 | 6.66 |
| 15 | 1.13 | 1.96 | 2.72 | 3.36 | 4.18 | 4.66 | 5.02 |
| 20 | 1.16 | 2.28 | 2.77 | 3.34 | 4.27 | 4.74 | 5.07 |
| 25 [2] | 1.50 | 2.79 | 3.63 | 4.14 | 5.15 | 5.18 | 5.23 |
| 30 | 1.17 | 1.88 | 2.42 | 2.88 | 3.53 | 4.00 | 4.32 |

[1] Average of water absorption values for three standard, porous concrete specimens treated with 20 grams of solution of TCST in mineral spirits at concentrations indicated.
[2] One specimen of the three had consistently high absorption.

Incorporation of other materials in the solution or dispersion of use is generally unnecessary and in some circumstances is to be avoided. As measured by the weight absorption of coated, concrete specimens, mixtures of trichlorosilanated tallow (TCST) and oleic acid have exhibited antagonism. Test results in this latter regard are set forth in Table III below:

TABLE III

| Composition of mixture used [1] (percent by weight) | | Water absorption (percent by weight) after immersion [2] | | | | | |
|---|---|---|---|---|---|---|---|
| Adduct | Oleic acid | 1 day | 2 days | 3 days | 4 days | 11 days | 18 days |
| 100 | 0 | 1.13 | 1.45 | 1.67 | 1.96 | 3.36 | 4.18 |
| 90 | 10 | 1.65 | 2.57 | 3.32 | 3.87 | 5.55 | 6.16 |
| 70 | 30 | 1.73 | 2.25 | 2.79 | 3.14 | 4.67 | 5.36 |
| 30 | 70 | 1.60 | 2.28 | 3.23 | 3.31 | 4.87 | 5.38 |
| 0 | 100 | 1.33 | 1.99 | 2.56 | 2.98 | 4.40 | 5.07 |

[1] Indicated mixture was dissolved in mineral spirits to make treating solution containing 15 percent by weight of the mixture of TCST and oleic acid.
[2] Average of water absorption values for three standard, porous concrete specimens treated with 20 grams of solution.

While the reaction product of the invention has special advantages as a waterproofing agent for concrete and other cementitious materials, it also has utility in other coating applications involving a substrate which contains either a silicate or calcium salts. For example, the silanated fatty substance of the invention has utility as a coating for asbestos fibers which are intended to be used as reinforcing fillers in various resin compositions. It was observed with some compositions that the tensile and flexural properties of finished articles were improved by use of the instant product as such a fiber coating. In addition, the silanated fatty substance of the invention has been used as a surface coating for various glass products in order to provide lubricity and abrasion-resistance.

In order to describe the invention more fully, the following examples are given, without however intending to limit the invention to the precise details thereof, except as is required by the appended claims.

EXAMPLE I

A quantity of trichlorosilanated tallow was prepared by first dissolving 100 grams of beef tallow in approximately 700 ml. of anhydrous ethyl ether. This solution was introduced into a dry, two-neck, one-liter flask equipped with a quartz reflux condenser and a magnetic stirring bar. The flask was secured inside a reactor where it was exposed to sixteen low-pressure mercury lamps with a total output of approximately thirty-five watts of ultraviolet energy having a wavelength of 2537 A.; and 200 grams of trichlorosilane was then added. Stirring was initiated and dry nitrogen gas was bubbled into the solution through a sintered glass gas-dispersion tube. After thirty minutes, the ultraviolet source was energized and radiation was continued thereafter for a period of forty-eight hours. During this time, the temperature of the reaction mass was held below 35° C. by means of a flow of air induced by an electric fan situated within the reactor. The originally slightly yellow solution became progressively less colored during radiation; and upon completion of the reaction, as noted by substantial decoloration of the reaction mass, the ether and excess trichlorosilane were removed under reduced pressure using a rotary evaporator. The yield was 130 grams of a syrupy, colorless liquid; and nuclear magnetic resonance analysis of this product indicated an olefinic hydrogen content of less than 10% of that of the tallow used as the starting ingredient. A chloride analysis of the reaction product indicated 18.8% hydrolyzable chlorine and 19.0% total chlorine.

In order to determine the hydrophobic properties of the trichlorosilanated tallow of this example, a 15% (by weight) solution of the material in mineral spirits was compared with a similar solution of beef tallow. Cured concrete speciments were coated with 20 grams of solution, three speciments being coated with each of the materials. The speciments were immersed in water and weighed periodically to determine water absorption, and average values for the three specimens are set forth in Table IV below.

TABLE IV

| Coating material | Water absorption (percent by weight) after immersion | | | | | |
|---|---|---|---|---|---|---|
| | 1 day | 2 days | 3 days | 4 days | 11 days | 18 days |
| TCST | 1.13 | 1.45 | 1.67 | 1.96 | 3.36 | 4.18 |
| Tallow | 5.56 | 6.87 | 7.44 | 7.71 | 8.62 | 8.92 |
| None | 10.4 | | | 10.3 | 10.4 | 10.5 |

Comparison of the water absorption values in the above table indicates that the trichlorosilanated tallow of the invention provided a substantial retardation in the absorption of water. Furthermore, the trichlorosilanated tallow coating was colorless and indiscernible from a visual standpoint.

The persistence of the hydrophobic properties of the trichlorosilanated tallow of this example was investigated by water-reabsorption tests in which the trichlorosilanated tallow was compared with an untreated control and with a trichlorosilanated tallow which was prepared in accordance with the described procedure with the exception that the amount of trichlorosilane was reduced so as to produce a product having an olefinic hydrogen content of approximately 35% of that of the beef tallow used as the starting ingredient. In these studies, six standardized concrete specimens were employed for each coating variable, and 20 grams of the stated solution was applied to each specimen. In Table V which summarizes the water absorption data, "MS" indicates that mineral spirits was used as the solvent whereas "K" indicates that kerosene was used as the solvent. Concentration of the coating material in the test solutions was established at 15% by weight. The specimens were first soaked to saturation and subsequently dried to a residual water content of about 2% by exposure to laboratory room atmosphere for 85 days. Thereafter, the samples were reimmersed and the data set forth in Table V was collected. These data indicate the persistence of the waterproofing effect of the instant composition as well as the superiority of the more completely silanated material.

TABLE V

| Coating material | Solvent used | Residual water (percent by weight) | Water absorption (percent by weight) [1] after reimmersion | | | | |
|---|---|---|---|---|---|---|---|
| | | | 9 days | 16 days | 26 days | 33 days | 54 days |
| Saturated TCST | MS | 2.09 | 3.37 | 3.97 | 4.54 | 4.97 | 5.78 |
| Do | K | 2.11 | 3.22 | 3.72 | 4.22 | 4.63 | 5.34 |
| Unsaturated TCST | MS | 2.11 | 3.70 | 4.28 | 5.00 | 5.48 | 6.40 |
| Untreated control [2] | | 5.19 | 6.81 | 7.41 | 7.88 | 8.33 | 8.98 |

[1] Based on original weight of untreated concrete specimens.
[2] In companion experiments of a like nature, water absorption values of 10 to 11 percent were measured within 9 days for untreated control specimens.

The trichlorosilanated beef tallow of this example was also compared with a commercial silicone sealer under various environmental conditions. The commercial silicone material used for these comparative purposes was obtained from Sika Chemical Corporation of Passaic, N.J., under the trade name "Sika Transparent." The TCST coatings for these investigations were prepared by adding the active ingredient to mineral spirits in an amount of 15% by weight. Twenty grams of this solution or twenty grams of the commercial silicone preparation was coated on each respective mortar slab. Five speciments were employed for each variable. Following treatment, groups of the coated specimens were exposed to different environmental conditions for three months. One group was placed in a fog room where it was exposed to a temperature of 75° F. and a relative humidity of nearly 100% for a period of three months. A second group was alternately wet and dried, five days in the fog room followed by two days exposure to laboratory atmospheric conditions and then the cycle repeated throughout the three-month period. A third set of specimens was buried in a soil made up of top soil, sand and peat moss, the prepared soil being kept wet throughout the three-month period. A fourth group of specimens was placed on the roof of a building in Columbus, Ohio, for the entire three-month period, during which time there was exposure to both winter and warm-weather conditions, including freezing and thawing. A final group of specimens was exposed to laboratory atmospheric conditions.

At the end of the initial exposure period, the samples were totally immersed in water for 179 days, whereupon the samples were removed and first room dried for eighteen days and subsequently oven dried for a period of sixty hours at 100° F., the results of these various drying steps being set forth in Table VI below. Thereafter, the samples again were totally immersed in water and weighed periodically to determine water absorption. Average value for five replicates of each variable are set forth in the table. The data in Table VI show that the water-absorption retardation qualities of the trichlorosilanated tallow of this example were not deteriorated by the procedures employed, whereas the silicone coated specimens exhibited almost no protection against water absorption.

It was however noted that the treated specimens shed dirt more readily than untreated controls.

EXAMPLES II AND III

Quantities of trichlorosilanated soybean oil and trichlorosilanated linseed oil were prepared by the method of Example I. For the former, 100 grams of soybean oil (ADM Superb, iodine No. 129 min.) was dissolved in 500 ml. of anhydrous ethyl ether. There was introduced into this solution, 250 grams (1.8 mol) of trichlorosilane; and the resultant mixture was ultraviolet irradiated for sixty-four hours. The yield was 118 grams of a light yellow oil.

For the latter, 100 grams of linseed oil (ADM Superb, iodine No. 175–190) was dissolved in 400 ml. of anhydrous ethyl ether. This solution was reacted with 241.6 grams of trichlorosilane. In this instance, the nitrogen stream was passed through a 1,1,2-trichloroethane bubbler and then to an inverted funnel over aqueous sodium hydroxide which was being stirred by a magnetic stirrer. Ultraviolet irradiation was continued for a period of ninety-two hours, and the yield was 111.9 grams of a nearly colorless oil.

Water-absorption studies were conducted comparing the trichlorosilanated materials of Examples II and III with the trichlorosilanated tallow of Example I and with the commercial silicone sealer mentioned in Example I. The results are set forth in Table VII below.

In preparing coating materials for application to the mortar slab specimens, mineral spirits solutions were made to include 15% of the active ingredient. One of the linseed oil solutions was prepared in the open atmosphere whereas all of the other trichlorosilanated materials were mixed with the solvent in an argon atmosphere. Twenty grams of each solution was used to coat the slabs by applying ten grams in each of two coatings with a 1-hour drying period between applications. Specimens were exposed for three months either to continuous fog-room conditions (70° F. and 100° relative humidity) or to laboratory-room conditions. The fog-room exposed specimens were thereafter dried for four days in a laboratory room; and following this drying period, the amounts of retained water were determined. Subsequently, all of the specimens were immersed in water and the amounts of ab-

TABLE VI

| Environmental conditions | Coating material | Residual water (percent by weight) | | Water absorption (percent by weight) after reimmersion | | | |
|---|---|---|---|---|---|---|---|
| | | Room dried | Oven dried | 7 days | 15 days | 22 days | 36 days |
| Alternate fog-room wetting (5 days) and drying (2 days). | TCST | 3.50 | 1.96 | 3.68 | 5.01 | 5.58 | 6.78 |
| | Silicone | 3.39 | 2.18 | 10.51 | 11.07 | 11.52 | 11.53 |
| | None | 3.66 | 2.50 | 9.97 | 11.08 | 11.53 | 11.68 |
| Fog room (continuous). | TCST | 2.80 | 1.30 | 3.04 | 4.25 | 4.69 | 5.94 |
| | Silicone | 4.30 | 2.75 | 9.37 | 10.42 | 10.68 | 10.98 |
| | None | 6.10 | 3.26 | 10.68 | 11.11 | 11.35 | 11.52 |
| Buried in soil of controlled quality. | TCST | 3.08 | 1.57 | 3.15 | 4.13 | 4.75 | 5.68 |
| | Silicone | 2.96 | 1.84 | 10.01 | 10.67 | 10.94 | 11.13 |
| | None | 3.51 | 2.22 | 10.13 | 10.61 | 10.78 | 10.99 |
| Roof top (seasonal weathering). | TCST | 4.77 | 2.62 | 5.06 | 6.53 | 7.35 | 8.40 |
| | Silicone | 4.08 | 2.47 | 10.87 | 11.14 | 11.19 | 11.30 |
| | None | 3.69 | 2.47 | 11.12 | 11.59 | 11.74 | 11.73 |
| Laboratory room. | TCST | 2.94 | 1.45 | 3.14 | 4.22 | 4.68 | 5.56 |
| | Silicone | 4.53 | 2.43 | 10.63 | 10.94 | 10.96 | 11.01 |
| | None | 5.29 | 3.08 | 10.89 | 11.10 | 11.11 | 11.23 |

In an effort to determine the reistance of the trichlorosilanated tallow of this example to microbial degradation, six soil samples were taken at random locations from the grounds of a long-established rendering plant. These samples were blended and diluted approximately one to ten with ordinary soil. Concrete specimens were treated with a 15% solution of the trichlorosilanated tallow of this example in mineral spirits and were then buried in the resultant soil mixture. After three months' burial, no significant impairment in water repellency was observed.

sorption were determined, the average water absorption rates being measured on six porous mortar slab specimens for each variable.

The data in Table VII indicates that the trichlorosilanated soybean oil compares favorably with trichlorosilanated tallow. These data also show that the trichlorosilanated linseed oil is of somewhat lesser value as a water-repellent but still of greater value than the commercial silicone sealer or no coating at all, especially with respect to samples initially exposed to fog-room conditions.

TABLE VII

| Coating material | Environmental exposure prior to soaking | Water content before soaking (percent by weight) | Water absorption (percent by weight) after immersion | | | | |
|---|---|---|---|---|---|---|---|
| | | | 3 days | 7 days | 14 days | 28 days | 56 days |
| TCS-soybean oil | Fog room | 4.28 | 4.44 | 4.62 | 4.86 | 5.29 | 5.84 |
| | Laboratory | 0.23 | 2.22 | 3.20 | 3.72 | 4.72 | 6.65 |
| TCS-tallow | Fog room | 4.72 | 4.88 | 5.03 | 5.37 | 5.78 | 6.27 |
| | Laboratory | 0.30 | 1.95 | 2.48 | 3.33 | 3.59 | 5.03 |
| TCS-linseed oil | Fog room | 5.39 | 5.57 | 5.72 | 5.91 | 6.24 | 6.78 |
| | Laboratory | 0.53 | 8.80 | 9.29 | 10.02 | 10.05 | 10.30 |
| TCS-air-mixed linseed oil | Fog room | 5.72 | 5.96 | 6.10 | 6.38 | 6.73 | 7.25 |
| | Laboratory | 0.35 | 9.17 | 9.48 | 9.76 | 10.00 | 10.05 |
| Silicone | Fog room | 7.07 | 7.65 | 8.23 | 8.85 | 9.42 | 10.04 |
| | Laboratory | 0.34 | 9.41 | 9.95 | 10.25 | 10.25 | 10.40 |
| Uncoated standards | Fog room | 8.39 | 8.77 | 9.20 | 9.66 | 10.11 | 10.44 |
| | Laboratory | 0.46 | 8.99 | 9.39 | 9.70 | 9.87 | 9.68 |

It will be apparent that many widely different embodiments of this invention may be made; and therefore, it is not intended to limit the present invention except as is indicated in the appended claims.

The invention is claimed as follows:

1. A coating composition consisting essentially of the reaction product of a silane having at least one hydrogen atom, the remaining substituents being hydrolyzable halogen atoms, and a fatty substance comprising the ester of a trihydric alcohol having an unsaturated acyl group containing from 4 to 22 carbon atoms wherein the unsaturated linkage is at an internal position; and a volatile vehicle inert with respect to said reaction product.

2. A coating composition according to claim 1 wherein said fatty substance is tallow.

3. A coating composition according to claim 1 wherein said fatty substance is linseed oil.

4. A coating composition according to claim 1 wherein said fatty substance is soybean oil.

5. A coating composition according to claim 1 wherein said vehicle is a non-polar solvent.

6. A coating composition according to claim 5 wherein said solvent is mineral spirits.

7. A coating composition according to claim 5 wherein said solvent is kerosene.

8. A coating composition according to claim 1 wherein said composition comprises at least about 5% by weight of said reaction product and the remainder vehicle.

9. A coating composition according to claim 1 wherein said silane is a polyhalosilane.

10. A coating composition according to claim 9 wherein said polyhalosilane is a polychlorosilane.

11. A coating composition according to claim 10 wherein polychlorosilane is trichlorosilane.

12. A coating composition according to claim 1 wherein in said reaction product contains no more than about 10% residual olefinic hydrogen.

13. A coating composition according to claim 1 wherein the olefinic linkage of said acyl group is disposed at an internal position on the hydrocarbon chain thereof.

14. For waterproofing concrete and analogous materials of a cementitious or calcerous nature, a coating composition comprising the reaction product of a polychlorosilane having at least one hydrogen substituent and a mixed triglyceride having an unsaturated constituent fatty acid containing from 12 to 22 carbon atoms and having the unsaturated linkage at an internal position.

15. An article of manufacture comprising a hydrated cementitious substrate surface-coated with the composition of claim 14.

16. The article of claim 15 wherein said composition is at least partially polymerized in situ.

17. For waterproofing concrete and analogous materials of a cementitious or calcerous nature, a coating composition comprising the reaction product of trichlorosilane and tallow.

References Cited

UNITED STATES PATENTS

| 2,679,491 | 5/1954 | Kennedy et al. | 260—22 |
| 2,721,873 | 10/1955 | MacKenzie | 260—448.2 |
| 2,723,987 | 11/1955 | Speier | 260—22 |
| 2,894,922 | 7/1959 | Olsen | 260—18 |

JULIUS FROME, *Primary Examiner.*

T. MORRIS, *Assistant Examiner.*

U.S. Cl. X.R.

106—243, 287; 117—135.1, 135.5; 260—448.2